UNITED STATES PATENT OFFICE.

ROBERT EDWARD CHATFIELD, OF SEWARDSTONE, ENGLAND.

PROCESS OF UTILIZING ACID SULFATES OF SODA.

SPECIFICATION forming part of Letters Patent No. 605,697, dated June 14, 1898.

Application filed December 20, 1897. Serial No. 662,722. (No specimens.) Patented in England October 17, 1893, No. 19,530; in Belgium April 27, 1894, No. 109,705, and in Germany May 11, 1894, No. 82,443.

*To all whom it may concern:*

Be it known that I, ROBERT EDWARD CHATFIELD, a subject of the Queen of Great Britain, residing at Woodlands, Sewardstone, in the county of Essex, England, have invented a new and useful Process of Utilizing Acid Sulfates of Soda, (for which I have obtained patents in Great Britain, No. 19,530, dated October 17, 1893; in Belgium, No. 109,705, dated April 27, 1894, and in Germany, No. 82,443, dated May 11, 1894;) and I do hereby declare that the following is a full, clear, and exact description of the invention, which will enable others skilled in the art to which it appertains to make and use the same.

In the manufacture of nitric acid, as described in the specification of my British Patent No. 16,512 of 1891, and also in the manufacture of other acids there is a residue consisting of acid sulfate of soda or sulfate of soda with excess of sulfuric acid. My invention relates to the utilization of such residues, which I effect as follows: I treat an aqueous solution of the residue with ammoniacal compounds from gas liquor or other sources, producing mixed sulfates of soda and ammonia, from which sulfate of soda and sulfate of ammonia are separated by fractional crystallization. Ammoniacal vapors can be directly passed into the acid-sulfate-of-soda solution, from which if it be very strong crystals are deposited while the liquor is hot and a further quantity when it is cooled.

The process should be conducted in the following manner: If we take as our standard normal bisulfate of soda treated with any of the above substances with sufficient water to keep the whole in solution, the salts of the resulting solution contain one equivalent of sulfate of soda to one equivalent of sulfate of ammonia equal to about forty-eight per cent. of sulfate of ammonia. This constitutes the proportions of the well-known double salt, the ammonio-sodic sulfate, which salt, though unstable under some conditions, persistingly forms under other conditions, and it is chiefly owing to its action that the separation of these two sulfates commercially has hitherto been deemed impossible.

The solution of the mixed sulfates, if required neutral, can be finished off with a little ammonia free from sulfur compounds, and the insoluble matter, iron, &c., can be removed by filtration or as may be most convenient.

Two processes are now available, A and B. A removes one-half or a little more of the sulfate of soda from the mixed sulfates in an anhydrous state, and B removes considerably more than one-half, as Glauber salts, in cold weather.

Process A: The solution containing salts with forty-eight per cent. sulfate of ammonia, which in this case is preferably of considerable strength, is evaporated till a sample has a specific gravity of about 1,380 at a temperature a little under its boiling-point. The deposited sulfate of soda can be from time to time fished out and drained from the mother-liquors, the salts of which liquor will then contain about sixty-five per cent. of sulfate of ammonia to thirty-five per cent. sulfate of soda or two equivalents of the former to one equivalent of the latter. If the liquor at a specific gravity of 1,380 be further evaporated, sulfate of soda carries down sulfate of ammonia with it in large quantities as the specific gravity rises, and thus no further separation can be commercially effected. The sulfates of soda fished out can be dissolved in water and crystallized.

Process B: The solution containing salts having forty-eight per cent. sulfate of ammonia is diluted to a specific gravity of 1,275 to 1,300 at 90° Fahrenheit, or to corresponding specific gravity at other temperatures such as may result from chemical action, allowance being made for steam going off at higher temperatures. On cooling, hydrated sulfate of soda (Glauber salts) crystallizes out and is drained from the mother-liquor and covered with water and allowed to soak before the liquid is run off. The crystallization of Glauber salts begins when the liquor is at a temperature of about 64° Fahrenheit when cooled rapidly in a cold atmosphere. These washings can be used for soaking subsequent lots until they become too rich. The washed crystals may thus be obtained with less than one-tenth per cent. of sulfate of ammonia. The salts of the mother-liquor may contain as much as seventy-seven per cent. of sulfate of ammonia, if well cooled. The colder the temperature the richer the salts will be in sulfate of ammonia. If the solution of the mixed sulfates be made too strong before setting it aside to crystallize, the double sulfates crystallize until the solution becomes dilute enough to enable the sulfate of soda to obtain its water of crystallization and to crystallize.

Any liquors having salts in solution containing sixty-five per cent. and upward of sulfate of ammonia are evaporated, and the mixed sulfates which are fished out or otherwise obtained, as well as any crystals rich in sulfate of ammonia that may result from the processes herein set forth, are brought into contact with cold mother-liquors or sulfate-of-soda washings or water by percolation or agitation, grinding, or otherwise till the specific gravity of the liquor ceases to rise, even though more solids are added to it. This specific gravity will vary according to the temperature of the air, &c., and the purity of the materials, but will be at a specific gravity of about 1,285.

The mixed sulfates which have been treated, as above, by percolation, agitation, grinding, or otherwise will yield up further sulfate of ammonia to weaker solutions or water, and the residue, chiefly sulfate of soda, can be dissolved in weak liquors or water and treated for separation, as herein described.

The salts in the liquor of 1,285 specific gravity should contain about eighty-eight per cent. sulfate of ammonia to twelve per cent. sulfate of soda or eight equivalents of the former to one equivalent of the latter. This liquor being evaporated down, sulfate of ammonia drops and can be fished. When this liquor becomes rich in sulfate of soda, which will be at a specific gravity of about 1,380, as much as possible is run off before recharging with fresh lots of eighty-eight-per-cent. solution. The liquor run off can be brought around into the circle again or treated separately. If it be allowed to cool, the mixed sulfates crystallize, leaving the liquor very rich in sulfate of ammonia.

The separation processes above described are applicable to sulfates of soda containing any excess of sulfuric acid.

Having now particularly described and ascertained the nature of this invention and in what manner the same is to be performed, I declare that what I claim is—

1. The herein-described process for treating acid sulfates of soda, by acting on their solutions with ammoniacal compounds, thereby producing mixed sulfates of ammonia and soda, and separating sulfate of soda and sulfate of ammonia therefrom by fractional crystallization.

2. The herein-described process for treating acid sulfates of soda, which consists in acting upon their solutions with ammoniacal compounds to produce mixed sulfates of ammonia and soda, evaporating the solution of said mixed salts to a specific gravity of about 1,380 at boiling temperature, to crystallize out sulfate of soda, removing the sulfate-of-soda crystals, continuing the evaporation to crystallize out the mixed salts, then dissolving the crystals of the mixed salt in cold mother-liquor to a specific gravity of 1,285 and evaporating the resultant solution to crystallize out sulfate of ammonia, substantially as described.

3. The herein-described process of treating acid sulfates of soda which consists in acting upon their solutions with ammoniacal compounds to produce mixed sulfates of ammonia and soda, evaporating the solution of said mixed salts to a specific gravity of about 1,380 at boiling temperature, to crystallize out sulfate of soda, and removing the sulfate-of-soda crystals from the solution, substantially as described.

4. The herein-described process of treating acid sulfates of soda which consists in acting upon their solution with ammoniacal compounds, to produce mixed sulfates of soda and ammonia, removing a portion of the sulfate of soda by crystallization, and crystallizing out mixed sulfates of soda and ammonia, treating said mixed sulfate crystals with cold mother-liquor, to produce a solution of a specific gravity of about 1,285, evaporating the solution to crystallize sulfate of ammonia and removing the sulfate-of-ammonia crystals, substantially as described.

ROBERT EDWARD CHATFIELD.

Witnesses:
  G. F. REDFERN,
  JOHN E. BOUSFIELD.